March 8, 1932. G. LOECK 1,848,788
APPLIANCE FOR EXAMINATION OF HOLLOW SPACES THROUGH A NARROW OPENING
Filed Feb. 15, 1929
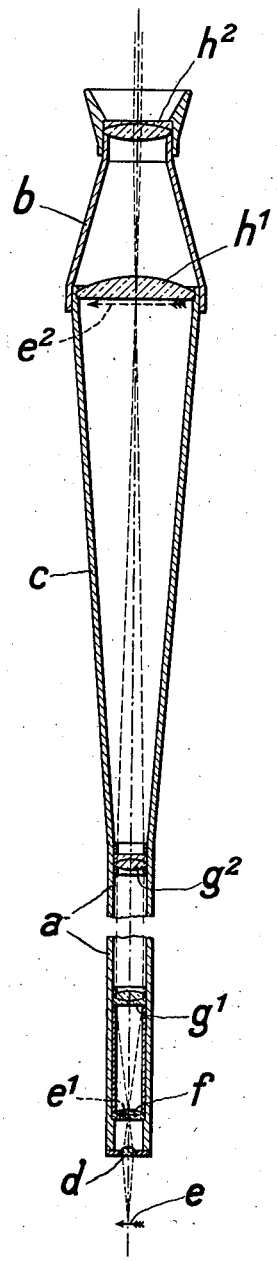
Inventor:
Günther Loeck Patented Mar. 8, 1932                                                          1,848,788

UNITED STATES PATENT OFFICE

GÜNTHER LOECK, OF BERLIN, GERMANY, ASSIGNOR TO THE FIRM GEORG WOLF G. M. B. H., OF BERLIN, GERMANY

APPLIANCE FOR EXAMINATION OF HOLLOW SPACES THROUGH A NARROW OPENING

Application filed February 15, 1929, Serial No. 340,241, and in Germany February 21, 1928.

The present invention relates to appliances for examination of hollow spaces through a narrow opening, e. g. to appliances for the examination of the interior of tubes or of hollow spaces in the human and animal bodies and especially to such appliances of this kind, through which the hollow space should be seen comparatively strongly manified.

According to the invention, an appliance specially adapted to this purpose is obtained by providing the same with one or several reversing systems all of whose lenses have approximately the same diameter and whereof at least one is composed of two members, which, conjointly, will bring about one reversion of the image, and when, at the same time, the arrangement is made in such a manner that the object to be examined also is magnified by the hindermost system.

The magnification of the image obtained by the objective being no longer devolved upon the eyepiece alone, one not only succeeds in giving the appliance a specially strong magnifying power but, at the same time, in providing it with a comparatively long and thin part, so that, with a comparatively small provision of optical means, it remains suitable for introduction into narrow and comparatively long tubes, canals, and the like. Of the said system consisting of two members, the single members are suitably arranged in the well-known manner by letting the front focus of the first member coincide with an image plane whereupon, with a middle distance of object, the rays of the image-forming pencils between the two members will be parallel. If, at the same time, the magnification of the image should be attained by the system composed of two members; the focal length of the back member has to be greater than the focal length of the front member and, in order to make possible the gradual extension of the diameter of the cone of rays, the back member is provided in the end of the thin part of the appliance. Besides the said reversing system in the thin part of the appliance, further of course reversing systems reversing another time the already magnified image can be provided.

The accompanying drawing shows in a section containing the axis of the appliance a constructional example of an appliance with one reversing system composed of two members which system, according to the invention, at the same time is the magnifying one.

The appliance is provided with a front cylindrical part $a$ of small diameter and a back part $b$ of greater diameter. Between both parts there is provided the conical part $c$ which conjoins the said two parts. In the front part $a$ there is an objective $d$ of short focal length, which gives a real reversed image $e^1$ of an object $e$. On the place of this image $e^1$ there is provided a collective $f$ and, behind, a reversing system consisting of two members, $g^1$ and $g^2$, is joining it. The first member of this system is provided in such a distance from the place of the image $e^1$, which is equal to its focal length, that, between the two members $g^1$ and $g^2$, the image-forming pencils will be parallel. The back member $g^2$ is provided in the end of the thin part of the appliance. As will be seen from the path of the rays as indicated in the drawing, the focal length of this member is considerably greater than the focal length of the front member $g^1$, and, consequently, an intermediate image $e^2$ is obtained at a great distance from the member $g^2$ and comparatively strongly magnified. For the examination of the intermediate image $e^2$ an eyepiece serves which consists of a field lens $h^1$ and an eye lens $h^2$.

I claim:

1. An appliance with comparatively strong magnification for introduction into narrow canals, containing an objective, at least one reversing system consisting of lenses all of which are of approximately the same diameter, of which reversing systems at least one consists of two members that conjointly once reverse the image of the object to be examined projected by the objective, an eyepiece, the hindermost of the said reversing systems having a smaller distance from the image projected by the optical members in front of it than from the eyepiece, and a casing containing in itself the said optical parts.

2. An appliance with comparatively strong magnification for introduction into narrow canals, containing an objective, a reversing system consisting of two collecting members of approximately the same diameter, an eyepiece, the said reversing system having a smaller distance from the image which the optical members project of the object to be examined than from the eyepiece, and a casing containing in itself the said optical parts.

3. An appliance with comparatively strong magnification for introduction into narrow canals, containing an objective, a reversing system consisting of two collecting members of approximately the same diameter having from each other a distance which is a multiple of their diameter, the back member having a focal length which is a multiple of the focal length of the other member, an eyepiece, the front member of the said reversing system having from the image which the optical members project of the object to be examined a distance equal to the focal length of the said front member, and the back member of the reversing system having from the eyepiece a distance equal to the focal length of the back member, and a casing containing in itself the said optical parts.

4. An appliance with comparatively strong magnification for introduction into narrow canals, containing an objective, a reversing system consisting of two collecting members of approximately the same diameter, an eyepiece, the foremost surface of this eyepiece having a diameter which is a multiple of the diameter of the members of the said reversing system, the reversing system having from the image which the optical members project of the object to be examined a smaller distance than from the eyepiece, and a casing containing in itself the said optical parts.

5. An appliance with comparatively strong magnification for introduction into narrow canals, containing an objective, a reversing system consisting of two collecting members of approximately the same diameter, an eyepiece, the foremost surface of this eyepiece having a diameter which is a multiple of the diameter of the members of the said reversing system, the reversing system having from the image which the optical members project of the object to be examined a smaller distance than from the eyepiece, a casing comprising a cylindrical part containing in itself the objective and the reversing system, comprising further a conical part tapering from behind the reversing system to the eyepiece and comprising finally a part containing in itself the eyepiece.

GÜNTHER LOECK.